United States Patent [19]
Merry

[11] Patent Number: 5,686,039
[45] Date of Patent: Nov. 11, 1997

[54] METHODS OF MAKING A CATALYTIC CONVERTER OR DIESEL PARTICULATE FILTER

[75] Inventor: Richard P. Merry, White Bear Lake, Minn.

[73] Assignee: Minnesota Mining and Manufacturing Company, St. Paul, Minn.

[21] Appl. No.: 496,945

[22] Filed: Jun. 30, 1995

[51] Int. Cl.$^6$ ............ B29C 31/06; B29C 49/08; B29C 55/00; B28B 11/08
[52] U.S. Cl. .................. 264/259; 264/292.2
[58] Field of Search .................. 264/234, 259, 264/297.2

[56] References Cited

U.S. PATENT DOCUMENTS

| | | | |
|---|---|---|---|
| Re. 27,747 | 9/1973 | Johnson | 165/166 |
| 3,001,571 | 9/1961 | Hatch | 154/2.6 |
| 3,441,381 | 4/1969 | Keith et al. | 23/288 |
| 3,709,706 | 1/1973 | Sowman | 106/57 |
| 3,795,524 | 3/1974 | Sowman | 106/65 |
| 3,916,057 | 10/1975 | Hatch et al. | 428/236 |
| 4,047,965 | 9/1977 | Karst et al. | 106/65 |
| 4,048,363 | 9/1977 | Langer et al. | 428/77 |
| 4,064,359 | 12/1977 | Peterson et al. | 174/107 |
| 4,087,039 | 5/1978 | Balluff | 228/173 R |
| 4,156,533 | 5/1979 | Close et al. | 277/229 |
| 4,269,807 | 5/1981 | Bailey et al. | 422/179 |
| 4,305,992 | 12/1981 | Langer et al. | 428/324 |
| 4,331,621 | 5/1982 | Brockmeyer | |
| 4,385,135 | 5/1983 | Langer et al. | 523/179 |
| 4,495,030 | 1/1985 | Giglia | 162/145 |
| 4,521,333 | 6/1985 | Graham et al. | 252/606 |
| 4,565,727 | 1/1986 | Giglia et al. | 428/172 |

(List continued on next page.)

FOREIGN PATENT DOCUMENTS

| | | |
|---|---|---|
| 0 319 299 | 6/1989 | European Pat. Off. . |
| 639 700 A1 | 2/1995 | European Pat. Off. . |
| 639 701 A1 | 2/1995 | European Pat. Off. . |
| 639 702 A1 | 2/1995 | European Pat. Off. . |

(List continued on next page.)

OTHER PUBLICATIONS

Stroom et al., "Systems Approach to Packaging Design for Automotive Catalytic Converters", Paper No. 900500, SAE Technical Paper Series, 1990.

Howitt, "Thin Wall Ceramics as Monolithic Catalyst Supports", Paper No. 800082, SAE Technical Paper Series, 1980.

Howitt et al., "Flow Effects in Monolithic Honeycomb Automotive Catalytic Converters", Paper No. 740244, SAE Technical Paper Series, 1974.

Howitt et al., "Cellular Ceramic Diesel Particulate Filter", Paper No. 810114, SAE Technical Paper Series, 1981.

Primary Examiner—Donald E. Czaja
Assistant Examiner—Jacqueline A. Ruller
Attorney, Agent, or Firm—Gary L. Griswold; Walter N. Kirn; Scott A. Bardell

[57] ABSTRACT

The invention provides a method of making a catalytic converter for automotive exhaust gases comprising:

(a) placing a catalytic converter element in a mold;

(b) injecting a sufficient amount of a flowable mounting material into the mold to form a seamless continuous coating around a portion of the element, the flowable mounting material comprising 2 to 90 dry weight percent of at least one unexpanded intumescent material, 10 to 98 dry weight percent of binder, 0 to 25 dry weight percent fibers, 0 to 70 dry weight percent of one or more fillers, and a liquid; and (c) removing the catalytic converter element from the mold. In a preferred embodiment the catalytic converter element is heated to a temperature from about 60° C. to about 150° C. after step (c) and then said catalytic element is disposed in a housing. Analogous methods of making diesel particulate filters and high temperature rigid filters are also described.

28 Claims, 7 Drawing Sheets

U.S. PATENT DOCUMENTS

| | | | |
|---|---|---|---|
| 4,617,176 | 10/1986 | Merry | 422/179 |
| 4,676,929 | 6/1987 | Rittler | 252/315.2 |
| 4,698,213 | 10/1987 | Shimozi et al. | |
| 4,863,700 | 9/1989 | Ten Eyck | |
| 4,865,818 | 9/1989 | Merry et al. | 422/179 |
| 4,866,107 | 9/1989 | Doxsee et al. | 523/153 |
| 4,904,343 | 2/1990 | Giglia et al. | 162/145 |
| 4,929,429 | 5/1990 | Merry | 422/179 |
| 4,929,502 | 5/1990 | Giglia | 428/357 |
| 4,951,954 | 8/1990 | MacNeill | 277/230 |
| 4,999,168 | 3/1991 | Ten Eyck | 422/179 |
| 5,008,086 | 4/1991 | Merry | 422/180 |
| 5,045,385 | 9/1991 | Luckanuck | 428/220 |
| 5,126,013 | 6/1992 | Wiker et al. | 162/156 |
| 5,137,656 | 8/1992 | Conner | 252/378 R |
| 5,139,615 | 8/1992 | Conner et al. | 162/145 |
| 5,151,253 | 9/1992 | Merry et al. | 422/179 |
| 5,207,989 | 5/1993 | MacNeil | 422/179 |
| 5,242,871 | 9/1993 | Hashimoto et al. | 501/95 |
| 5,250,269 | 10/1993 | Langer | 422/179 |
| 5,254,410 | 10/1993 | Langer et al. | 428/402 |
| 5,290,522 | 3/1994 | Rogers et al. | 422/179 |
| 5,332,609 | 7/1994 | Corn | 428/77 |
| 5,384,188 | 1/1995 | Lebold et al. | 428/283 |
| 5,385,873 | 1/1995 | MacNeill | 501/95 |
| 5,464,578 | 11/1995 | Salter et al. | 264/250 |
| 5,523,059 | 6/1996 | Langer | 422/179 |

FOREIGN PATENT DOCUMENTS

| | | |
|---|---|---|
| 2 634 479 | 1/1990 | France. |
| 3514150 | 4/1985 | Germany. |
| 4194463 | 7/1992 | Japan. |
| 5164472 | 6/1993 | Japan. |
| 5-245324 | 9/1993 | Japan. |
| 1 513 808 | 6/1978 | United Kingdom. |
| 1 522 646 | 8/1978 | United Kingdom. |
| 1 604 908 | 12/1981 | United Kingdom. |
| 2 164 580 | 3/1986 | United Kingdom. |

5,686,039

METHODS OF MAKING A CATALYTIC CONVERTER OR DIESEL PARTICULATE FILTER

FIELD OF THE INVENTION

The present invention relates to supports for catalytic converters and diesel particulate filters, and a method for mounting supports in a catalytic converter or diesel particulate filter.

BACKGROUND OF THE INVENTION

Pollution control devices are employed on motor vehicles to control atmospheric pollution. Two types of pollution control devices are currently in widespread use - - - catalytic converters and diesel particulate filters. Both of these types of devices typically contain a monolithic structure mounted within a metal housing with a mounting material disposed between the structure and the walls of the housing. The monolithic structure, or monolith, is currently made from metal or more commonly, a ceramic material. The housing is typically made of stainless steel.

A catalytic converter also includes a catalyst, which is typically coated onto the interior of the monolithic structure housed in the converter. The catalyst catalyzes reactions that oxidize hydrocarbons and carbon monoxide and reduce the oxides of nitrogen. Ceramic monoliths generally have very thin walls and are susceptible to breakage. Typically, a ceramic monolith has a coefficient of thermal expansion about an order of magnitude less than the metal housing in which it is contained. To avoid damage to the ceramic monolith from road shock and vibration, to compensate for the differences in thermal expansion of the monolith and housing, and to prevent exhaust gases from flowing between the monolith and metal housing, ceramic mat materials are typically disposed between the ceramic monolith and the metal housing. Ceramic mat materials and intumescent sheet materials useful for supporting the ceramic monolith are described in U.S. Pat. Nos. 3,916,057 (Hatch et al.), 4,305, 992 (Langer et al.), and 4,385,135 (Langer et al.).

Catalytic converters employing intumescent sheet mounting materials generally use a single rectangularly shaped sheet or mat having a slot on one end and a tab on the other. The sheet or mat is wrapped around the lateral outer surface of the ceramic monolith with tab and slot engaged to form a seam in the mat. A disadvantage of such systems is that the tab must fit exactly into the slot to ensure a tight gas seal about the periphery of the ceramic monolith. This mounting method is difficult to perform in an automated process and hand operations can be expensive and time consuming. In addition, the ceramic monoliths typically vary +/–2 mm in diameter; therefore, the circumference, or perimeter, of the monolith may vary +/–6 mm. This variance in monolith diameter means that the mat will tend to be either too long or too short as the individual ceramic monolith varies.

An overlap of the mat can cause improper closure of the housing with the attendant risk of mounting failure or crushing of the ceramic monolith. An overlap is usually avoided by designing the mat length for a monolith having the minimum perimeter. This ensures that mat overlap will never occur, but it also means that the mat will often be too short and leave a space or gap where the two ends of the mat should come together. This space is undesirable because it provides additional edge area on the mat for the exhaust gas to impinge upon. Under severe driving conditions this exposed edge can provide a site for mat erosion to begin. This space also allows a greater amount of heat to be conducted to the metal housing because hot exhaust gases come into direct contact with the metal housing and can eventually damage the housing.

Attempts have been made in the past to inject a water based paste directly between the monolith and the metal housing (U.K. Patent Specification 1,522,646). This method requires some way of centering the monolith inside of the housing and a method of sealing the metal housing prior to injecting the paste. Since the housing is sealed, it is difficult to determine if the entire area between the monolith and metal housing has been filled adequately to protect the monolith. Also, any subsequent welding can be problematic because when the housing is heated for the first time, steam from the paste is driven off. This steam can cause excess pressure within the housing and may blow out some of the mounting material. Additionally, once the water is driven off, the paste may shrink so that it no longer exerts a sufficient holding force to keep the monolith in place. This problem can limit the assembled mount density and the initial mounting force. The paste material typically must be heated to approximately 600° C. to expand the intumescent material to secure the monolith in the housing. It has also been suggested that the monolith may be coated directly with an intumescent composition (U.S. Pat. No. 3,916,057 (Hatch et al.))

A disadvantage to the methods that have been used is the difficulty in applying a uniform coating around the fragile monolith. Any areas having an overly thick coating of the paste can exert excessive pressure against the monolith when it is heated, which can result in crushing of the monolith.

An ongoing need remains for a seamless intumescent material that can be used to securely mount the monolith in a catalytic converter or in a diesel particulate filter, that avoids the problems associated with previously known mat and paste mounting materials, and that can be easily used in automated assembly.

SUMMARY OF THE INVENTION

The invention provides a method of making a catalytic converter for automotive exhaust gases comprising:

(a) placing a catalytic converter element in a mold;

(b) injecting a sufficient amount of a flowable mounting material into the mold to form a seamless continuous coating around a portion of the element, the flowable mounting material comprising 2 to 90 dry weight percent of at least one unexpanded intumescent material, 10 to 98 dry weight percent of binder, 0 to 25 dry weight percent fibers, 0 to 70 dry weight percent of one or more fillers, and a liquid; and (c) removing the catalytic converter element from the mold.

In a preferred embodiment, the method further comprises disposing said catalytic converter element in a housing after step (c). Analogous methods of making diesel particulate filters and high temperature rigid filters are also described.

The invention also provides a catalytic converter element comprising a predetermined non-uniform coating of a mounting material.

The invention provides a catalytic converter comprising:

(a) a housing; and (b) a catalytic converter element disposed within said housing;

said catalytic converter element having a predetermined non-uniform coating of a mounting material.

The invention also provides an alternative method of making a catalytic converter for automotive exhaust gases comprising:

(a) placing end-caps onto a catalytic converter element;

(b) coating a sufficient amount of a flowable mounting material onto the element to form a continuous coating around the element;

(c) directing a knife around the periphery of the forms to produce a predetermined non-uniform coating of a mounting material; and (d) removing the end-caps from the element.

Analogous methods of making diesel particulate filters and high temperature rigid filters are also described.

Additional features and advantages of the invention will be set forth in the description which follows, and in part will be apparent from the description, or may be learned by practice of the invention. The objectives and other advantages of the invention will be realized and attained by the methods and articles particularly pointed out in the written description and claims hereof.

It is to be understood that both the foregoing general description and the following detailed description are exemplary and explanatory and are intended to provide further explanation of the invention as claimed.

DETAILED DESCRIPTION OF THE INVENTION

The invention provides a method of making a catalytic converter for automotive exhaust gases comprising:

(a) placing a catalytic converter element in a mold;

(b) injecting a sufficient amount of a flowable mounting material into the mold to form a seamless continuous coating around a portion of the element, the flowable mounting material comprising 2 to 90 dry weight percent of at least one unexpanded intumescent material, 10 to 98 dry weight percent of binder, 0 to 25 dry weight percent fibers, 0 to 70 dry weight percent of one or more fillers, and a liquid; and (c) removing the catalytic converter element from the mold.

In one embodiment, the catalytic converter element is disposed in a housing after step (c). The housing is preferably metallic. In one embodiment the catalytic converter element is heated after step (c). Alternatively, the catalytic converter element may be heated after step (b) and before step (c). In a preferred embodiment the catalytic converter element is heated to a temperature from about 60° C. to about 150° C. after step (c) and then said catalytic converter element is disposed in a housing. The seamless continuous coating is preferably formed around a major portion of the element.

Figure 1:
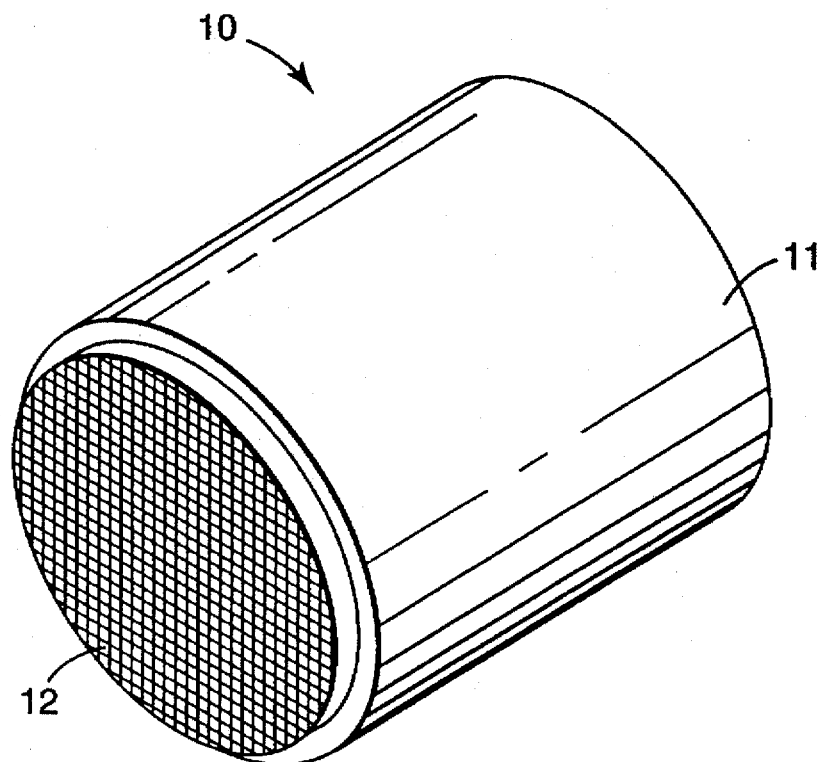
FIG. 1 is a perspective view of molding material molded onto a monolith.

The present invention also provides a monolithic structure assembly (10) shown in FIG. 1 having an intumescent mounting material (11) molded around the outside lateral surface of the monolithic structure (12) to a predetermined outside dimension. In particular, the monolithic structure or monolith is a ceramic or metal structure or a high temperature rigid filter. An example of a high temperature rigid filter is a ceramic foam filter for filtering molten aluminum. The structure can subsequently be mounted in a housing, such as a metal can or casing, used for catalytic converters or diesel particulate filters.

Figure 2:
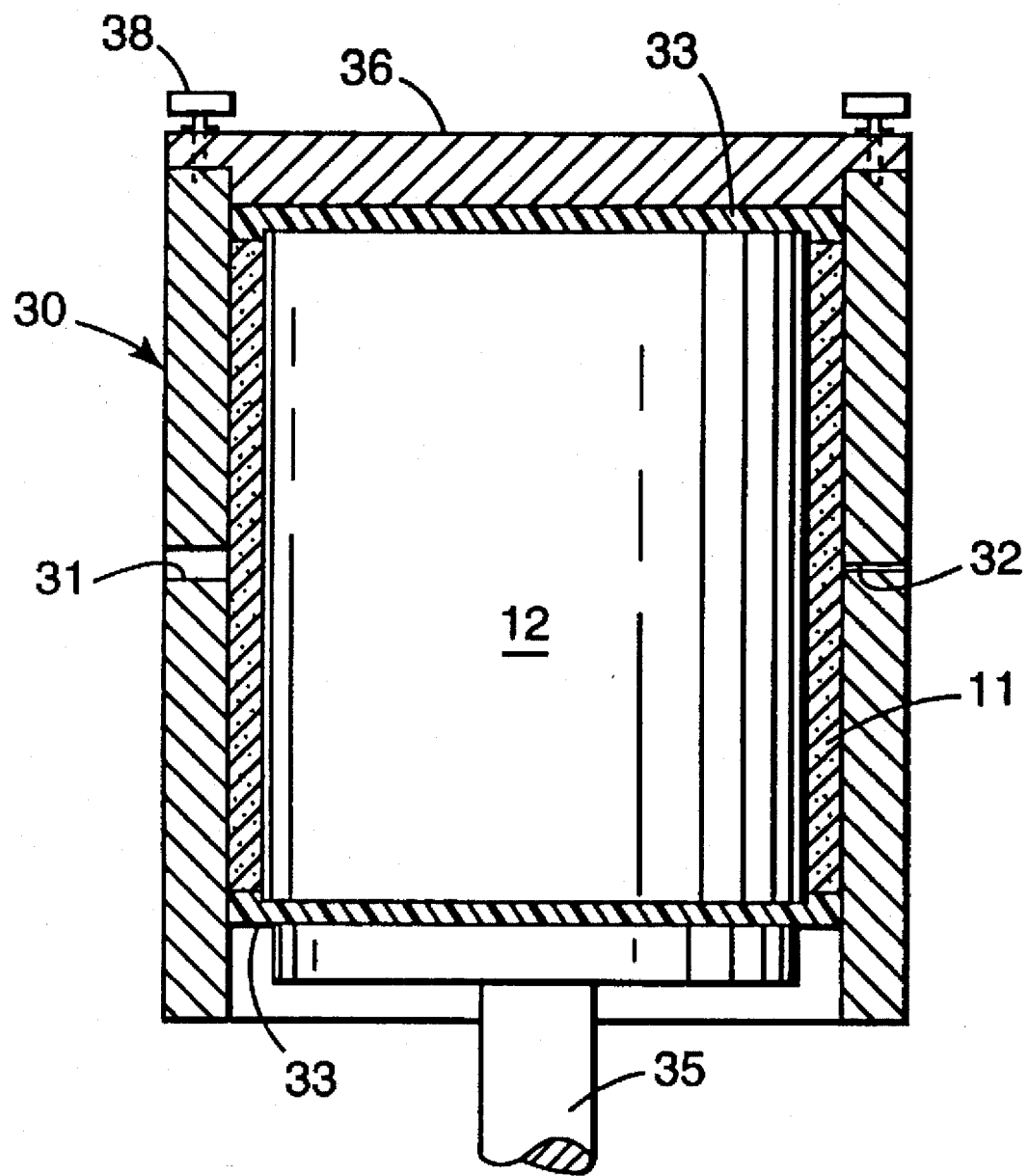
FIG. 2 is a cross-sectional view of a mold filled with monolith and paste.

In the practice of the invention, a mold (30) shown in FIG. 2 is provided which approximates the contour and inside dimension of the metal housing into which the monolithic structure is to be inserted. The mold dimensions are determined with consideration given to the amount of shrinkage that the paste will exhibit after the volatiles are removed. The mold has at least one port (31) through which an intumescent material can be injected. Preferably, the port is located midway along the axial length of the mold. Additionally, one or more openings (32) are preferably provided to permit air to continuously bleed out as the mold is filled. In a specific embodiment, the opening for removal of air is located 180° from the injection port.

The mold can also be provided with end caps (33) made of suitable materials such as plastic, rubber metal, or the like. The end caps generally extend axially beyond the edge of the monolith to properly center it in the mold cavity. In one embodiment, the bottom end cap rests on a piston (35) which is later used to eject the monolith assembly from the mold after coating.

Figure 3:
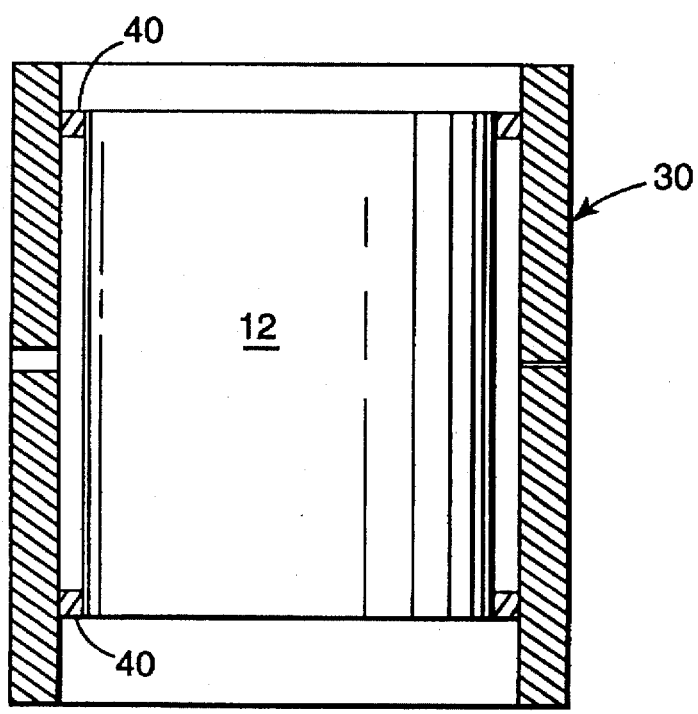
FIG. 3 is a cross-sectional view of a monolith with strips attached to each end of the monolith for centering in the mold.

The catalyzed monolith is then securely positioned inside of the mold. This can be done in a variety of ways. For example, the mold can further include a rigid cover (36) held in place with fasteners (38) so that the monolith with end caps is sealed between cover (36) and piston (35). In an alternative embodiment shown in FIG. 3 the monolith (12) is positioned inside of the mold (30) by attaching a narrow strip of a mat or sheet material (40) around one or both ends of the monolith. The strip then acts as a spacer to center the monolith in the mold and to provide a continuous gap between the mold and the monolith. The strip can be attached with any conventional means including adhesive, pressure-sensitive adhesive tapes, staples, and the like. The strip can be temporary, in which case it could be removed prior to mounting the coated monolith in a catalytic converter or diesel filter. Suitable temporary materials include, but are not limited to, cardboard, flexible foam sheets, plastic sheets, and the like. The strip can also be permanent in which case it would be mounted into the converter or filter with the monolith. Suitable sheet or mat materials for this use include the temporary materials as well as intumescent sheet and mat materials such as those described in U.S. Pat. Nos. 3,916,057 (Hatch et at.), 4,385,135 (Langer et at.), and 4,305,992 (Langer et at.), all of which are incorporated herein by reference. Examples of suitable commercially available materials include Interam™ Automotive Mounting Mats from Minnesota Mining & Manufacturing Co. Edge protection materials, including a strip of wire mesh fabric as disclosed in U.S. Pat. No. 5,008,086 (Merry) and the glass filled strip material disclosed in EP 639 701 A1 (Howorth et al.), EP 639 702 A1 (Howorth et at.), and EP 639 700 A1

(Stroom et at.), each of which are incorporated herein by reference, may also be used. Suitable commercially available wire mesh seals include knitted and/or compressed end seals obtained from ACS Industries Inc., Woonsocket, R.I., or Metex Industrial Products Div. Edison, N.J., which may also be used to seal the monolith in the housing. The latter approach would provide further protection from erosion by hot gases at the edges of the coating during use in a catalytic converter.

A viscous intumescent composition, preferably as a paste, is injected into the mold until it is filled, as could be evidenced by the paste seeping out of the opening(s) for air bleed out. Preferably, the intumescent compositions are high viscosity pastes that maintain a shape when molded, but are sufficiently flowable so that the composition can be pumped and injected into the mold. After the composition has filled the gap between the mold and the monolith, the monolith assembly can be separated from the mold by means such as ejecting the assembly from the mold or removing the mold from the assembly. The resulting monolith assembly has a seamless coating of paste continuously surrounding the monolith and a controlled outside diameter. The coated assembly optionally can be dried to remove the volatile materials by, for example, placing the coated monolith in an oven at 105° C. for about 16 hours. The monolith assembly can subsequently be securely mounted in a catalytic converter housing without requiring the labor intensive steps needed for mounting mats. Alternatively, the coated assembly can be dried by microwave drying.

Useful compositions include pastes having a binder and an intumescent agent, preferably dispersed in water, although solvents can be used in some compositions. A typical paste composition includes, by dry weight percent, 2 to 90 percent of at least one unexpanded intumescent material, 98 to 10 percent binder, 0 to 25 percent fibers, and 0 to 70 percent fillers. In a preferred embodiment the paste comprises 40 to 80 dry weight percent of unexpanded vermiculite. In another preferred embodiment the paste comprises 40 to 80 dry weight percent unexpanded vermiculite and 20 to 50 dry weight percent of binder. In a particularly preferred embodiment the paste comprises 40 to 80 dry weight percent of unexpanded vermiculite, 20 to 50 dry weight percent of inorganic binder, and 1 to 5 dry weight percent of organic fibers. Preferably, the composition includes 64.2% #4 unexpanded vermiculite, 33.8% binder (14.2% clay, 19.6% expanded vermiculite) and 2.0% rayon fiber.

Useful binder materials, or binders, can include one or more inorganic binders, one or more organic binders, or any combinations thereof. Suitable inorganic binder materials include water swellable clays, such as montmorillonite (present in major mounts in bentonite, hectorite, and saponite) and kaolinite, water swellable synthetic mica, such as tetrasilisic fluorine mica, in either the water-swelling unexchanged form or after flocculation, as the exchanged salt with a divalent or polyvalent cation, expanded vermiculite, and ground expanded vermiculite (also described as delaminated vermiculite) which can be prepared, for example, by ball-milling or high shear mixing of expanded vermiculite.

Organic binders include polymers and elastomers, which can be used in various forms including aqueous polymer emulsions, i.e., a latex, solvent based compositions, and as 100% solids. Suitable elastomers and polymers include natural rubbers, synthetic rubbers such as styrene butadiene, acrylonitrile-butadiene, acrylate and methacrylate homopolymers and copolymers, and polyurethanes.

The organic binder can include at least one of a tackifier (s), a plasticizer(s), or other modifiers, such as a rheology modifier(s), or combinations thereof. Tackifiers, or tackifying resins include hydrocarbons or modified rosin esters, and typically provide adhesive-type properties to a polymer. Tackifiers aid in holding the binder, and fillers together. Plasticizers tend to soften a polymer matrix and thereby contribute to the flexibility and moldability of the sheet materials made from the composition. Rheology modifiers can increase or decrease the viscosity of the composition and can include, for example, acrylic latexes.

A preferred organic binder material includes an aqueous acrylic emulsion. Acrylic emulsions are preferred because of their aging properties and noncorrosive combustion products. Useful acrylic emulsions include those commercially available under the trade designations "RHOPLEX TR-934" (a 44.5% by weight solids aqueous acrylic emulsion) and "RHOPLEX HA-8" (a 44.5% by weight solids aqueous emulsion of acrylic copolymers) from Rohm and Haas of Philadelphia, Pa. A preferred acrylic emulsion is commercially available under the trade designation "NEOCRYL XA-2022" (a 60.5% solids aqueous dispersion of acrylic resin) from ICI Resins U.S. of Wilmington, Mass.

A preferred organic binder material comprises acrylic resin in the range from about 20 to about 40 percent by weight, plasticizer(s) (e.g., such as that commercially available under the trade designation "SANTICIZER 148" (isodecyl diphenyl diphosphate) from Monsanto of St. Louis, Mo.) in the range from about 40 to about 20 percent by weight, tackifier(s) (e.g., rosin tackifier such as that commercially available under the trade designation "SNOWTACK 820A" (a 50% by weight aqueous rosin dispersion; melting point of rosin: 55° C.) from Eka Nobel, Inc., of Toronto, Canada) in the range from about 40 to about 20 percent by weight, based on the total weight of the resulting dispersion. These ranges provided a compromise between the desired flexibility of the binder material and minimizing the mount of organic binders which bum out during heating to the use temperature.

Suitable intumescent materials include unexpanded vermiculite, vermiculite ore, hydrobiotite, water swellable synthetic tetrasilicic fluorine type mica described in U.S. Pat. No. 3,001,571, alkali metal silicate granules as described in U.S. Pat. No. 4,521,333 (Graham et at.), and expandable graphite. Suitable intumescent materials also include Expantrol™ granules available from Minnesota Mining & Manufacturing Co., St. Paul Minn. Preferred intumescent materials are unexpanded vermiculite, vermiculite ore, and expandable graphite.

The composition can also include reinforcing fibers in amounts from about 0 to 25 percent by weight of the dried composition. Various types of fibers may be used alone or in combination depending on the end result desired. For example, organic fibers may be used to provide resiliency and strength to bond particulate materials of the paste together prior to heating. These fibers are typically burned off within several heating cycles of a catalytic converter. Useful organic fiber materials include regenerated cellulose and acrylics. Commercially available organic fibers include CFF™ brand Fibrillated Acrylic Fibers from Cytec Industries, Inc., West Paterson, N.J. Rayon fibers are commercially available from various suppliers including Mini Fiber, Inc., Johnson City, Tenn.

Inorganic fibers may also be included to bind the particulates prior to heating, as well as to provide strength and resiliency before, during, and after exposure to high temperatures. Useful materials for fibers include graphite, alumina-silica, silica, calcia-silica, asbestos, glass, and metals, such as Inconel and stainless steel. Suitable inorganic fibers include soft glass fibers, refractory filaments, such as zirconia-silica fibers described in U.S. Pat. No. 3,709,706, crystalline alumina whiskers, aluminosilicate fibers, and ceramic fibers disclosed in U.S. Pat. Nos. 3,795,524 (Sowman) and 4,047,965 (Karst et at.).

Suitable fibers that are commercially available for use as reinforcement fibers or as chopped fibers dispersed within the mounting materials include aluminosilicate fibers (available, for example, under the trade designations "NEXTEL 312 CERAMIC FIBERS," "NEXTEL 440 CERAMIC FIBERS," and "NEXTEL 550 CERAMIC FIBERS" from Minnesota Mining & Manufacturing Company), "FIBER-FRAX 7000M" from Carborundum Company of Niagara Falls, N.Y., "CERAFIBER" from Thermal Ceramics of Augusta, Calif., and stainless steel fibers (commercially available, for example, under the trade designation "BEKI-SHIELD GR90/C2/2" from Bekaert Steel Wire Corp. of Atlanta, Ga.).

In one embodiment of the invention, the composition preferably includes glass fibers having a diameter less than about 1.5 micrometer, and preferably less than about 1 micrometer, and glass fibers having a diameter from about 5 to 20 micrometers, and preferably from about 8 to 12 micrometers in diameter. Useful types of glasses include calcium borosilicate glasses, such as calcium aluminoborosilicate glasses, magnesium aluminoborosilicate glasses, and alkali borosilicate glasses. Preferred glasses are alkali borosilicate glasses and magnesium aluminosilicate glasses. The term "glass" as used herein refers to an amorphous (i.e., a material having a diffuse x-ray diffraction pattern without definite lines to indicate the presence of a crystalline phase) inorganic oxide material. Suitable glass fibers have a softening point near the temperature of use. This temperature is typically below about 900° C., preferably below about 850° C., and most preferably below about 800° C. The term "softening point" refers to the temperature at which a glass in the form of a fiber of uniform diameter begins to deform under its own weight. Suitable glass fibers include those commercially available under the Micro-Strand™ Micro-Fibers™ trademarks from Schuller International, Inc., and S-2 glass fibers from Owens Corning Toledo, Ohio. When used the glass fibers less than about 1.5 micrometers in diameter are included in amounts from about 0.25 percent by weight to about 5 percent, and preferably from about 0.25 percent to about 1 percent.

Other types of fillers may also be included in the composition in amounts of from 0 to 70 percent by weight. Useful fillers include low density materials such as pearlite, fillite, fly ash, or diatomaceous earth. These low density materials can be used to improve the thermal conductivity of the mounting materials and keep the outside shell of the catalytic converter cooler. Other useful fillers include crushable fillers such as glass bubbles, z-light spheres from Zeelan, and Macrolite™ ceramic spheres from 3M; these crushable fillers collapse during the initial heating to reduce the compression of the mounting material. Other inert fillers can be added to improve the rheology of the paste composition or to reduce cost. Examples of inert fillers include alumina or silica powder.

The compositions can further include surfactants or foaming agent to aid in dispersing the materials in water or solvent to form uniform dispersions.

The modulus of the intumescent mounting material can be changed by wrapping a reinforcing material, such as corrugated wire mesh fabric, around the monolith prior to injection of the intumescent paste. The wire mesh is of sufficient porosity as to allow the paste to be injected through it. Suitable wire mesh fabrics include 304 stainless steel wire mesh, #12 crimp, 48 density 0.011" wire, single or multiple strand, commercially available from Metex Industrial Product Div., Edison, N.J. The resulting assembly is a seamless, intumescent coating with an internal wire mesh reinforcement.

Alternatively, the paste could be injected around a mat wrapped monolith. Suitable mats would include Interam™ mats from 3M or ceramic papers from Carborundum, Niagara Falls, N.Y., or Thermal Ceramics, Augusta, Ga.

In a preferred embodiment, the mounting material is a fiberless paste having, on a dry weight basis, 30 to 40 percent inorganic binders, and 60 to 70 percent intumescent materials. In another preferred embodiment, the paste is formed from inorganic binders, intumescent materials, and from about 0.25% to about 1% by weight microfibers having a diameter of less than about 1.5 micrometer. In another embodiment, the paste composition is free of refractory ceramic fibers.

Figure 4:
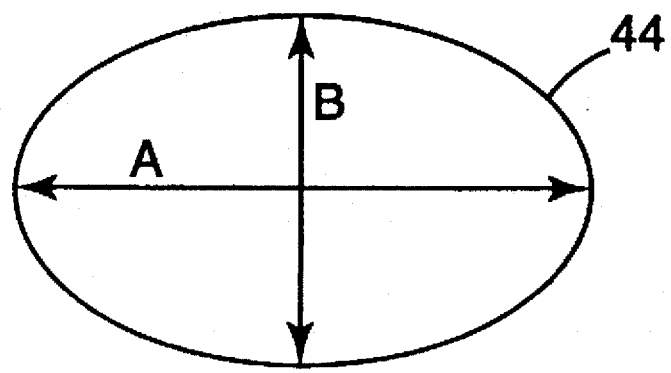
FIG. 4 is an end view of a monolith showing major cross-sectional axis and minor cross-sectional axis.
Figure 4A:
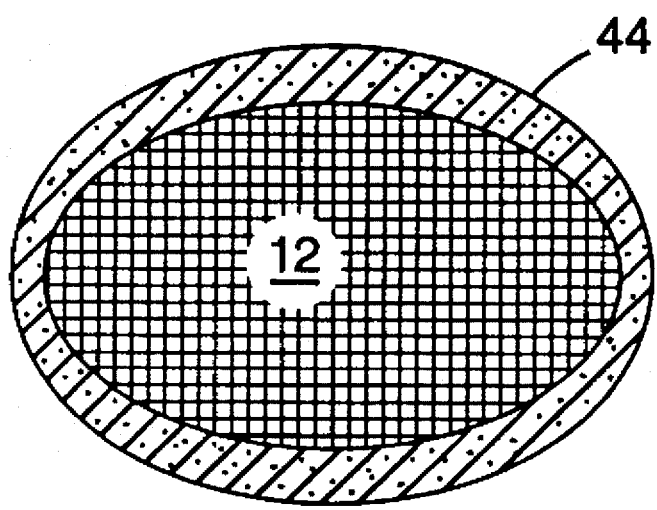
FIG. 4A is an end view of a monolith with paste applied.

The method of the invention can also be used to provide a nonuniform thickness of mounting material around the periphery of a monolith which is not generally feasible with mat or sheet mounting. This is an important consideration because the stiffness of the can or housing can be nonuniform and the pressure exerted against the monolith can be nonuniform as a result. For example, in a housing having an elliptical or oval racetrack shaped cross-section, FIG. 4, the can (44) is much stiffer along its major axis (A) than it is along its minor axis (B). Thus it can be advantageous to design the mold so that the monolith is coated with a thicker layer of paste along the minor axis to produce a more uniform force about the entire periphery of the monolith as shown in FIG. 4A. The monolith may also be coated with a somewhat thinner layer of paste in the areas that are at a 45° angle to the cell walls of the monolith. The monolith has its lowest strength along this axis.

Figure 5:
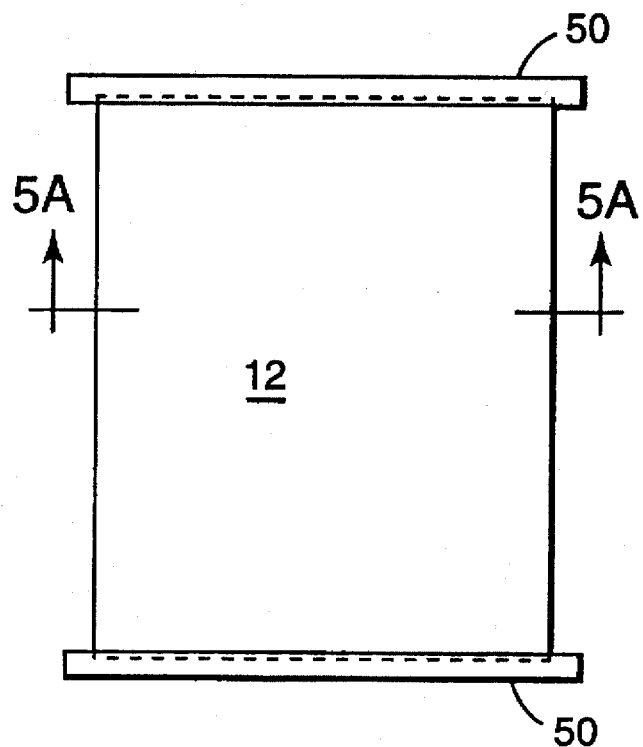
FIG. 5 illustrates the configuration of end-caps for knife coating.
Figure 5A:
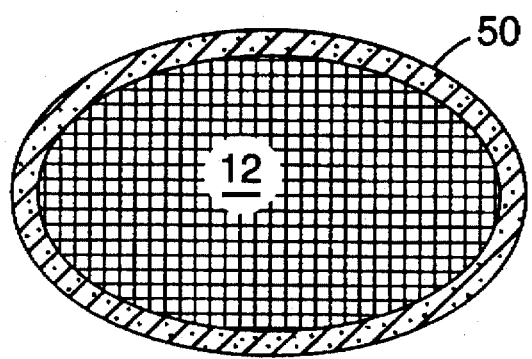
FIG. 5A is an end view of a monolith with paste applied.

In an alternative embodiment of the invention, the paste composition can be uniformly knife coated onto the monolith. This can be done by providing two end caps (50) shown in FIG. 5 that fit over the ends of the monolith and have sidewalls with a thickness approximately equal to the desired thickness of the coating. The end caps are securely positioned over the ends of the monolith and an excess of paste is applied to the monolith. A knife, positioned against the end caps, is drawn around the periphery of the monolith and the excess paste is removed by the knife. The resulting monolith assembly is optionally dried and then mounted in a housing.

In practice, a mat or sheet material can also be used in combination with the coated monolithic structure assembly. For example, it may be desirable to use a paste composition having a material that intumesces at a lower temperature, such as expandable graphite, than the intumescent material of the mat, or vice versa. This would be particularly useful for mounting a catalytic converter for a diesel vehicle where low temperature expandable graphite would be used.

The invention also provides advantages in the assembly of a catalytic converter. Since the dimensions of the mold are constant, the amount of paste injected into the mold is controlled by the size of the monolith and can therefore compensate for the large dimensional tolerance of the ceramic monolith. Thus, if a monolith were on the small end of the tolerance range, it receives a greater amount of paste than a similar monolith on the large end of the tolerance range. Both monoliths after coating and drying would have substantially the same outer dimension. Since the cost of producing ceramic monoliths is to a large degree a function of the dimensional tolerance required, it is possible to reduce the cost of making the monoliths by broadening the dimensional tolerances and compensating for these larger tolerances by varying the amount of intumescent paste applied. Additionally, the present invention eliminates the normal gap and the slot/tab configuration of prior art catalytic monolith mounting mats and thereby eliminate the gaps as sources of heat transfer and mat erosion.

The metal housing, which is also referred to as a can or a casing, can be made from suitable materials known in the art for such use. Preferably, the housing is made of stainless steel.

Suitable catalytic converter elements, also referred to as monoliths and monolithic structures, are known in the art and include those made of metal or ceramic. The monoliths or elements are used to support the catalyst materials for the converter. A useful catalytic converter element is disclosed, for example, in U.S. Pat. No. RE 27,747 (Johnson).

Further, ceramic catalytic converter elements are commercially available, for example, from Corning Inc. of Corning, N.Y., and NGK Insulator Ltd. of Nagoya, Japan. For example, a honeycomb ceramic catalyst support is marketed under the trade designation "CELCOR" by Corning Inc. and "HONEYCERAM" by NGK Insulator Ltd. Metal catalytic converter elements are commercially available from Behr GmbH and Emitec Co. of Germany.

For additional details regarding catalytic monoliths see, for example, "Systems Approach to Packaging Design for Automotive Catalytic Converters," Stroom et al., Paper No. 900500, SAE Technical Paper Series, 1990; "Thin Wall Ceramics as Monolithic Catalyst Supports," Howitt, Paper 800082, SAE Technical Paper Series, 1980; and "Flow Effects in Monolithic Honeycomb Automotive Catalytic Converters," Howitt et al., Paper No. 740244, SAE Technical Paper Series, 1974.

The catalyst materials coated onto the catalytic converter elements include those known in the art (e.g., metals such as ruthenium, osmium, rhodium, iridium, nickel, palladium, and platinum, and metal oxides such as vanadium pentoxide and titanium dioxide). For further details regarding catalytic coatings see, for example, U.S. Pat. No. 3,441,381 (Keith et al.).

Conventional monolithic type diesel particulate filter elements are typically wall flow filters comprised of honeycombed, porous, crystalline ceramic (e.g., cordierite) material. Alternate cells of the honeycombed structure are typically plugged such that exhaust gas enters in one cell and is forced through the porous wall of one cell and exits the structure through another cell. The size of the diesel particulate filter element depends on the particular application needs. Useful diesel particulate filter elements are commercially available, for example, from Corning Inc. of Corning, N.Y., and NGK Insulator Ltd. of Nagoya, Japan. Further, useful diesel particulate filter elements are discussed in "Cellular Ceramic Diesel Particulate Filter," Howitt et al., Paper No. 810114, SAE Technical Paper Series, 1981.

The following non-limiting examples illustrate specific embodiments of the invention.

TEST METHODS

Real Condition Fixture Test (RCFT)

The RCFT is a test used to measure the pressure exerted by the mounting material under conditions representative of actual conditions found in a catalytic converter during normal use.

Square samples measuring 33.1 mm by 33.1 mm are cut from the mounting material and positioned between two 50.8 mm by 50.8 mm metal platens. The platens are controlled independently and are heated to different temperatures to simulate the metal housing and the monolith temperatures, respectively. Simultaneously, the space or gap between the platens is increased by a value calculated from the temperature and thermal expansion coefficients of a typical catalytic converter. The temperatures of the platens and the gap change are presented in Table 1 below. The force exerted by the mounting material is measured by a Sintech ID computer controlled load frame with Extensometer (MTS Systems Corp., Research Triangle Park, N.C.). The test results are shown in a graph of pressure vs. temperature.

TABLE 1

| Top Platen Temperature (°C.) | Botton Platen Temperature (°C.) | Gap Change (MM) |
| --- | --- | --- |
| 25 | 25 | 0 |
| 50 | 25 | 0 |
| 100 | 30 | 0 |
| 150 | 33 | 0 |
| 200 | 35 | 0 |
| 250 | 38 | 0 |
| 300 | 40 | 0 |
| 350 | 45 | 0 |
| 400 | 50 | 0 |
| 450 | 60 | 0 |
| 500 | 70 | 0 |
| 550 | 85 | 0.0127 |
| 600 | 100 | 0.0254 |
| 650 | 125 | 0.0381 |
| 700 | 150 | 0.0508 |
| 750 | 185 | 0.0762 |
| 800 | 220 | 0.1016 |
| 850 | 325 | 0.1651 |
| 900 | 430 | 0.2286 |
| 900 | 480 | 0.2667 |
| 900 | 530 | 0.3048 |
| 850 | 502 | 0.2921 |
| 800 | 474 | 0.2794 |
| 750 | 445 | 0.2540 |
| 700 | 416 | 0.2286 |
| 650 | 387 | 0.2159 |
| 600 | 358 | 0.2032 |
| 550 | 329 | 0.1905 |
| 500 | 300 | 0.1778 |
| 450 | 275 | 0.1651 |
| 400 | 250 | 0.1524 |
| 350 | 210 | 0.1270 |
| 300 | 180 | 0.1016 |
| 250 | 155 | 0.0889 |
| 200 | 130 | 0.0762 |
| 150 | 95 | 0.0508 |
| 100 | 60 | 0.0254 |
| 50 | 43 | 0.0127 |
| 25 | 25 | 0 |

High Speed Compression Test

This test shows the ability of a mounting material to maintain pressure as it is rapidly compressed.

A 5.08 cm diameter disc is cut from the mounting material and mounted between two 10.5 cm diameter movable plates positioned 7 mm apart. The plates are closed at a closing speed of 254 cm/min and the gap is reduced from 7 mm to 3 mm. The gap is maintained at 3 mm for 1 minute while recording pressure using an MTS Tensile Tester, MTS Systems Corp. The test results are printed in a graph of pressure vs. gap distance.

Hot Shake Test

The Hot Shake Test is used to evaluate a mounting material for a catalytic converter by subjecting a catalytic converter with the mounting to vibration and hot exhaust gas from a gasoline engine.

A catalytic converter, with the ceramic monolith mounted securely within it, is attached to a solid fixture atop a shaker table (Model TC 208 Electrodynamic Shaker Table from Unholtz-Dickie Corp., Wallingford, Conn.). The converter is then attached through a flexible coupling to the exhaust system of a Ford Motor Co. 7.5 liter displacement V-8 gasoline powered internal combustion engine. The converter is tested using an inlet exhaust gas temperature of 900° C. at an engine speed of 2200 rpm with a 30.4 kg-meter load using an Eaton 8121 Eddy-current dynamometer while shaking the converter at 100 Hz and 30 g acceleration from the shaker table. The converter is shaken for 100 hours and then taken apart and examined visually.

Cold Erosion Test

This test is an accelerated test conducted under conditions that are more severe than actual conditions in a catalytic converter and provides comparative data on the ability of a mounting composite to resist erosion from an impinging air stream.

A test sample is cut into a square measuring 2.54 cm by 2.54 cm, weighed, and mounted between two high temperature Inconel 601 steel plates using steel spacers to obtain a mount density of 0.700+/−0.005 g/cm$^3$ (the steel spacers are selected to arrive at a mount density of 0.700 g/cm$^3$). The test assembly is then heated for one hour at 800° C. and then cooled to room temperature. The cooled test assembly is weighed to the nearest 0.01 gram and the assembly is then positioned 3.8 mm in front of an impinging air jet of near sonic velocity, and oscillating back and forth over the edge of the mat at 20 cycles per minute over a distance of 1.9 cm. The edge of the mounting composite is exposed to the impinging air jet. The erosion rate is determined by the weight loss divided by the time of the test and is reported in grams/hour (g/hr).

Example 1

Figure 6:
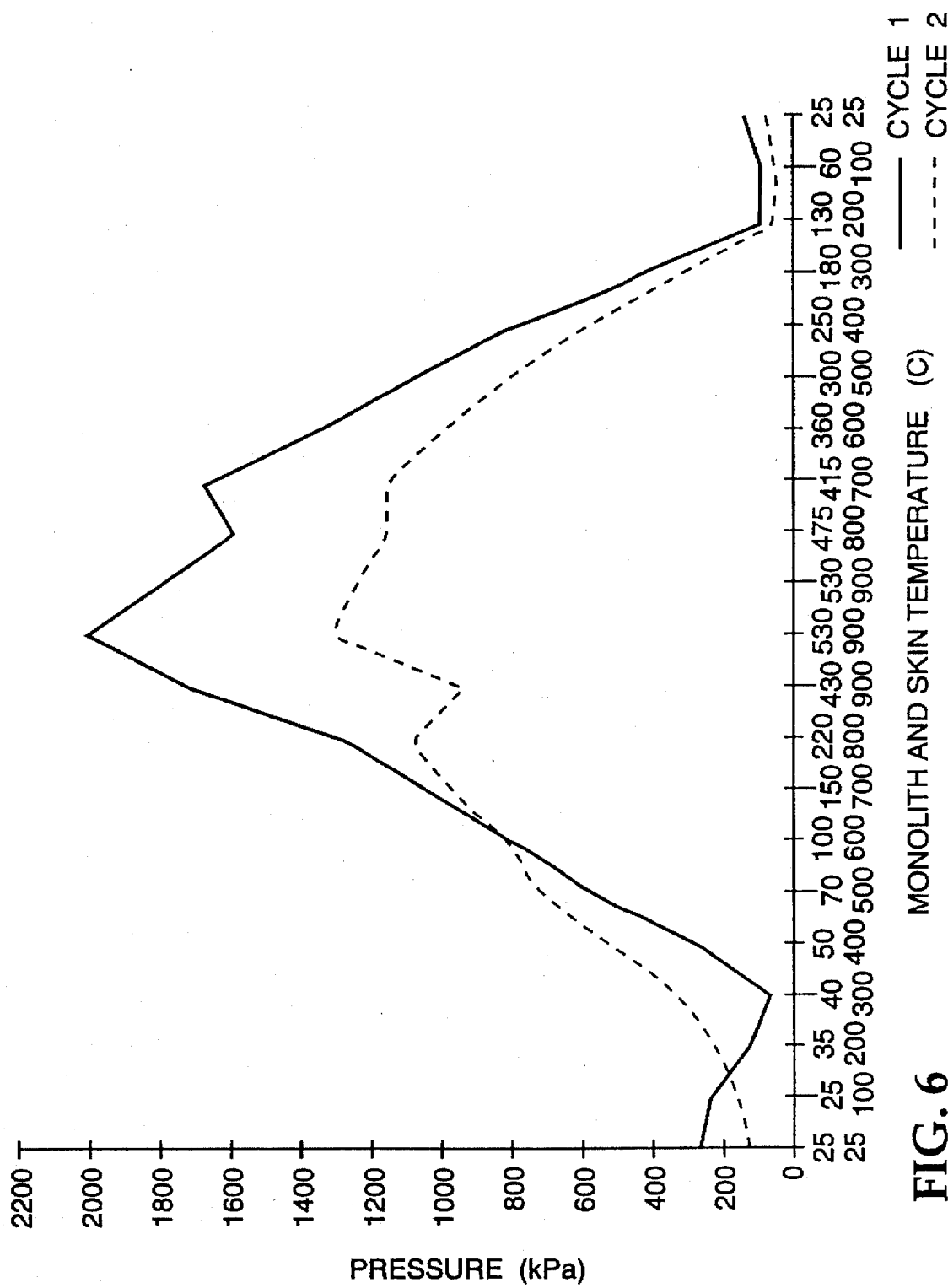
FIG. 6 contains the Real Condition Fixture Test curves for Example 1.

An intumescent composition was prepared by adding 199.8 grams of #5 expanded vermiculite (W.R. Grace Co., Cambridge, Mass.), 131.4 grams of 200 mesh Bentonite Clay (Black Hills Bentonite Co., Casper Wyo.) and 874.8 grams of water to a one gallon (3.8 liter) Baker Perkins Sigma blade mixer (Model 4 AN2 from Baker Perkins, now APV Chemical Machinery, Inc. Saginaw, Mich.), and mixing for 40 minutes. Then 594 grams of #4 vermiculite ore (Cometals, Inc., New York, N.Y.) were added and mixing continued for an additional 5 minutes. The composition was then cast onto a Teflon film into a sheet that was approximately 6 mm thick and dried overnight at about 35° C. The dried composition was 35.8% binder (clay and expanded vermiculite) and 64.9% intumescent material (vermiculite ore). The dried composition was tested for mounting compression according to the RCFT described above. The curves in FIG. 6 show the holding pressure vs. temperature for two temperature cycles on the RCFT. The results show that sufficient pressure was exerted by the inorganic paste over the entire temperature range normally encountered in a catalytic converter.

Figure 7:
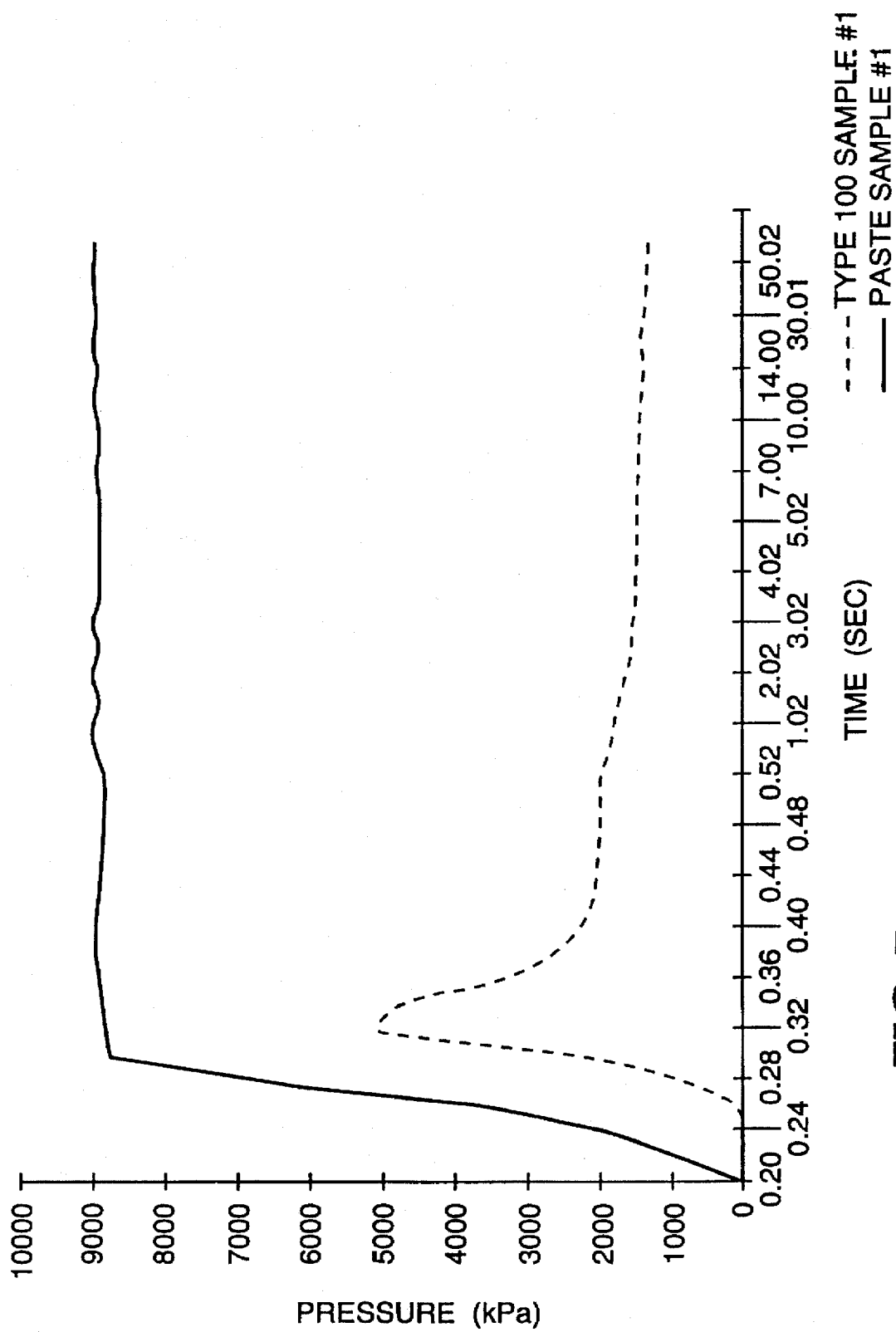
FIG. 7 illustrates the high speed compression test curves for the paste of Example 1 and for an Interam™ Type 100 Automotive Mounting Mat.

The paste sheet was also tested for high speed compression and compared with a mat material of the prior art having a similar thickness. The test results are plotted on a graph of pressure vs. time shown in FIG. 7. The graph indicates that the inorganic paste was stiffer and built pressure faster, but it maintained the pressure, which unlike the prior art which relaxed with time. This ability to maintain the pressure is another advantage provided by fiber free materials.

The paste sheet was tested in the Cold Erosion Test and it had an erosion rate of 0.00083 g/hr.

Comparative Example C1

An Interam™ Type 100 Automotive Mounting Mat was tested in the Cold Erosion Test and it had an erosion rate of 0.100 g/hr.

Example 2

A standard caulking tube was filled with the paste composition of Example 1. A round 12.7 cm outside diameter metal tube that was approximately 16.5 cm long with a wall thickness of 1.6 mm was used as a mold. An 11.84 cm diameter by 15.24 cm long monolith was inserted into the mold. Two narrow strips of Interam™ Automotive Mounting Mats, approximately 12 mm wide, were wrapped around each end of the monolith to center it and seal it within the mold. The metal tube had an approximately 3 mm diameter port located about midway along the length of the tube for injecting the paste composition. Also, approximately midlength, but 180° from the injection hole was a smaller hole which allowed air to bleed out of the mold cavity during injection. The inorganic paste was injected into the mold cavity using a hand-held caulking gun containing the caulking tube filled with the inorganic paste. The paste was injected into the mold until it began coming out of the air bleed hole at which time injection was stopped. The coated monolith was then pushed out of the tubular mold. The monolith was covered with a smooth seamless coating of the inorganic, fiberless paste. The paste coated monolith was then put into an oven at approximately 105° C. overnight to dry. The resulting assembly was a very hard coating of a fiberless, inorganic paste adhered to the surface of the monolith.

Example 3

The inorganic paste composition of Example 1 was knife coated onto two oval ceramic monoliths. Each monolith had an outside dimension of 146 mm by 89 mm by 89 mm long, and after drying, the coated monolith outside dimensions approximated the inside dimension of a 409 SS dual cavity can (obtained from Maremont Corp. Loudon, Tenn.). The coated monoliths were placed inside the 409 SS can and the can was welded shut. Since there was virtually no initial holding force, the catalytic converter assembly was heated to about 500° C. for 1 hour to expand the mounting material. The converter was then tested on the Hot Shake Test. After 100 hours, the converter was then taken apart and the mounting material was found to be in good shape, i.e., little cracking. There had been no relative movement of the monolith inside of the can, indicating that the mounting material had securely held the monolith under the very severe conditions of the hot shake test.

Example 4

A slush was prepared by mixing 5 grams of glass fibers having a nominal diameter of 0.65 micrometers (Type 475-106 Micro-Strand™ Micro-Fibers™ available from Schuller International, Inc., Denver, Colo.) and 874.8 grams of water for 30 seconds in a blender (Model 32BL39 available from Waring). The fiber/water slush was than added to a one gallon (3.8 liter) Baker Perkins Sigma Blade mixer which contained 194.8 grams of #5 expanded vermiculite (W.R. Grace Co.) and 131.4 grams of 200 mesh Bentonite clay and mixed for 30 minutes. Then 594 grams of #4 vermiculite ore (available from Cometals Inc.) was added and mixed for 5 minutes. The resulting paste composition, (dry weight percent) was 0.5% fibers, 35.3% binder (expanded vermiculite and clay), and 64.2% intumescent material.

The paste composition was then cast onto a Teflon film into a sheet that was approximately 6 mm thick and dried overnight at about 35° C. The dried paste sheet was tested in the Cold Erosion Test and it had an erosion rate of 0.00042 g/hr.

Example 5

An intumescent composition was prepared by adding 181.8 grams of #5 expanded vermiculite (W.R. Grace Co., Cambridge, Mass.), 131.4 grams of 200 mesh Bentonite Clay (Black Hills Bentonite Co., Casper Wyo.) and 874.8 grams of water to a one gallon Baker Perkins Sigma blade mixer and mixing for 20 minutes. Then 18 grams of 6.35 mm long 1.5 denier rayon fibers (available from Mini Fiber, Inc., Johnson City, Tenn.) were added in increments of 6 grams each, and mixing for about 5 minutes after each addition. Then 594 grams of #4 vermiculite ore (Cometals, Inc.) were added and mixing continued for an additional 5 minutes. The resulting paste had a composition of 33.85% binder, 1.95% organic fiber, and 64.2% intumescent material.

The paste composition was then cast onto a Teflon film into a sheet that was approximately 6 mm thick and dried overnight at about 35° C. The dried paste sheet was tested in the Cold Erosion Test and it had an erosion rate of 0.0011 g/hr.

Examples 6–8

In Examples 6–8, the paste compositions of Examples 1, 4, and 5, respectively, were knife coated onto NGK ceramic monoliths (obtained from Maremont Corp., Loudon, Tenn.) having an oval cross section and measuring 14.48 cm by 8.13 cm by 7.52 cm long. Machined aluminum end caps having an oval cross section shape approximating that of the monolith cross section and measuring about 0.635 cm larger than the monolith cross section were provided. The end caps were about 1.27 cm thick and each was machined 0.635 cm from the circumferential edge with an oval shape that approximated the cross sectional dimension of the monolith to a depth 0.635 cm so that the end caps fit over the ends of the monolith. Each paste composition was then pressed onto the exposed skin of a monolith between the two end caps and a spatula was drawn against the end caps around the entire assembly. The end caps were then removed and the coated monoliths were dried in an oven at about 95° C. for about 4 hours. Visual observations of the coatings are as follows:

Example 6–A seamless paste coating was bonded to the monolith; small cracks having 0.1 to 1.5 mm width and length as great as 3 cm were present.

Example 7–A seamless paste coating was bonded to the monolith with no cracking.

Example 8–A seamless paste coating was bonded to the monolith with no cracking.

The observations in Examples 6, 7, and 8 indicate that the addition of small amounts of either organic or inorganic fibers improved the resiliency and resistance to cracking of the paste compositions.

Example 9

Figure 8:
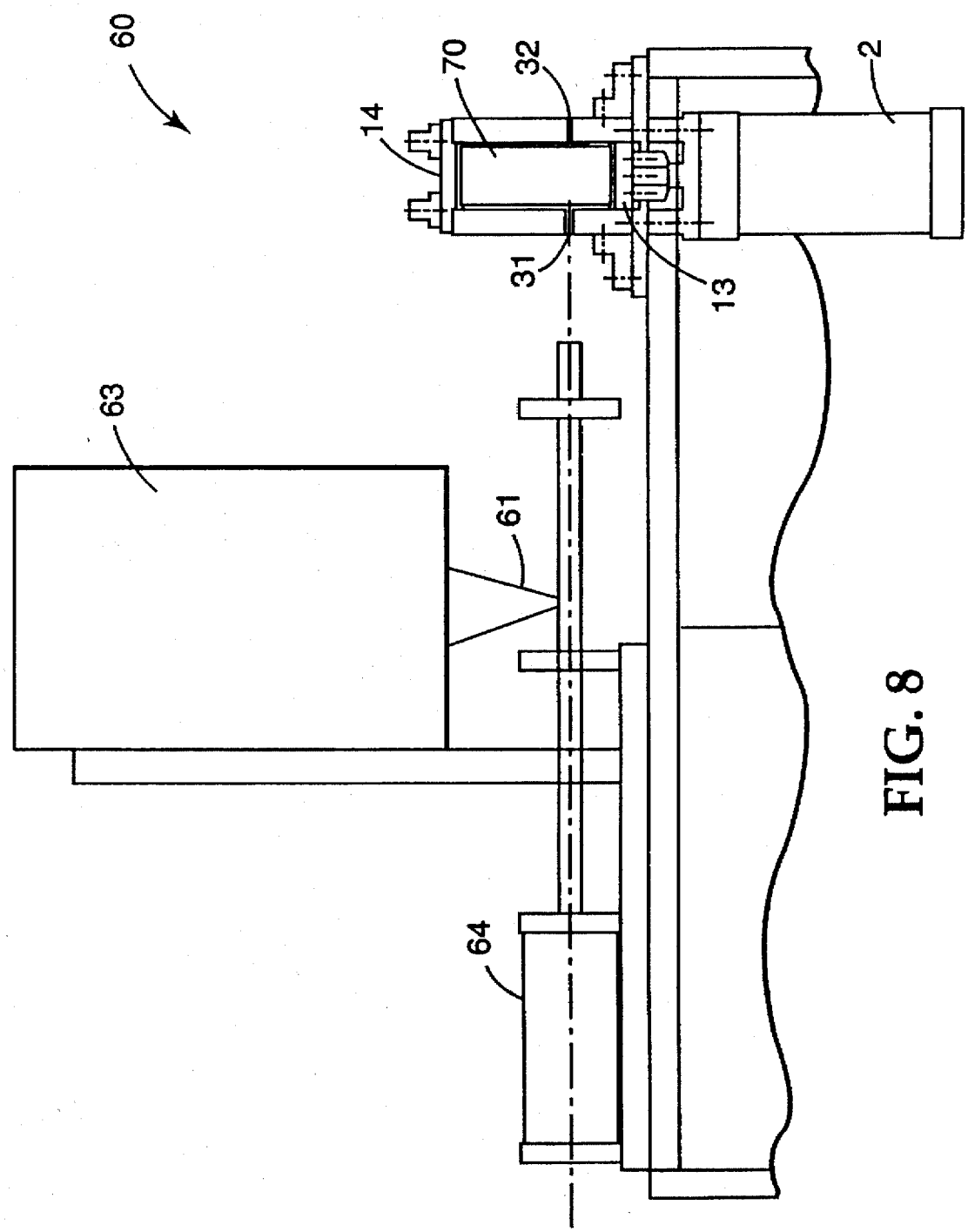
FIG. 8 is a schematic of an apparatus for molding the mounting material around the monolith.

A molding apparatus (60) was provided according to the schematic of FIG. 8 having a pressure tank (63) filled with a pumpable material. Bottom outlet (61) of the tank fed the material into a rod metering pump (64), and the pump injected the material into a cylindrical mold (70) having an oval cross section. The mold was provided with an inlet port (31), an air bleed hole (32), a bottom end plate (13), and a top end plate (14). The end plates were used to center the monolith in the mold and to hold it in place while the paste was injected. Bottom end plate (13) was attached to an air cylinder (2) which was used to push the coated monolith out of the mold cavity.

A 3.2 in (8.13 cm) by 5.7 in (14.48 cm) by 2.96 in (7.52 cm) long oval ceramic NKG monolith (obtained from Maremont Corp., Loudon, Tenn.) was placed into the mold cavity and centered using the end plates such that there was a uniform 0.2 in (5.1 mm) gap around the monolith. Five gallons (21.1 liters) of the paste composition of Example 1 was placed in the pressure tank and the tank was pressurized to 40 pounds per square inch—psi (275.8 kiloPascals (kPa)). The rod metering pump, set at 22 psi (151.7 kPa) was actuated and left on until the paste started to leak out of the air bleed hole. The pump was then turned off and the top end plate was unlocked and removed. The air cylinder, set at a line pressure of 22 psi (151.7 kPa), was actuated and pushed the bottom plate and the monolith assembly up out of the mold. The monolith assembly was dried at room temperature for about 12 hours. The resulting assembly had a smooth seamless coating that adhered well to the surface of the monolith.

It will be apparent to those skilled in the art that various modifications and variations can be made in the method and article of the present invention without departing from the spirit or scope of the invention. Thus, it is intended that the present invention cover the modifications and variations of this invention provided they come within the scope of the appended claims and their equivalents.

What is claimed is:

1. A method of making a catalytic converter for automotive exhaust gases comprising:

(a) placing a catalytic converter element in a mold;

(b) injecting a sufficient amount of a flowable mounting material into the mold to form a seamless continuous coating around a portion of the element, the flowable mounting material comprising 2 to 90 dry weight percent of at least one unexpanded intumescent material, 10 to 98 dry weight percent of binder, 0 to 25 dry weight percent fibers, 0 to 70 dry weight percent of one or more fillers, and a liquid;

(c) removing the coated catalytic converter element from the mold.

2. The method of claim 1, further comprising disposing said catalytic converter element in a housing after step (c).

3. The method of claim 2, wherein said housing is metallic.

4. The method of claim 1, wherein said catalytic converter element is dried after step (c).

5. The method of claim 1, wherein said catalytic converter element is heated after step (b) and before step (c).

6. The method of claim 1, wherein said catalytic converter element is heated to a temperature from about 60° C. to about 150° C. after step (c) and then said catalytic converter element is disposed in a housing.

7. The method of claim 1, wherein said seamless continuous coating is formed around a major portion of the element.

8. The method of claim 1, wherein said at least one intumescent material is unexpanded vermiculite or unexpanded, expandable graphite.

9. The method of claim 1, wherein said binder is an inorganic binder.

10. The method of claim 1, wherein said binder is an organic binder.

11. The method of claim 1, wherein said binder is a combination of an inorganic binder and an organic binder.

12. The method of claim 1, wherein said flowable mounting material contains no fibers.

13. The method of claim 1, wherein said fibers are inorganic fibers.

14. The method of claim 13, wherein said fibers are glass fibers having a diameter of less than about 1.5 micrometers.

15. The method of claim 1, wherein said fibers are organic fibers.

16. The method of claim 15, wherein said organic fibers are rayon fibers.

17. The method of claim 9, wherein said inorganic binder comprises at least one of a water swellable clay, water swellable synthetic mica, expanded vermiculite, or ground expanded vermiculite.

18. The method of claim 10, wherein said organic binder comprises at least one of a tackifier or plasticizer.

19. The method of claim 1, wherein said liquid is water.

20. The method of claim 1, wherein said flowable mounting material comprises 40 to 80 dry weight percent of unexpanded vermiculite.

21. The method of claim 1, wherein said flowable mounting material comprises 40 to 80 dry weight percent unexpanded vermiculite and 20 to 50 dry weight percent of binder.

22. The method of claim 1, wherein said flowable mounting material comprises 40 to 80 dry weight percent of unexpanded vermiculite, 20 to 50 dry weight percent of inorganic binder, and 1 to 5 dry weight percent of organic fibers.

23. The method of claim 22, wherein said organic fibers are rayon fibers.

24. The method of claim 1, wherein said catalytic converter element has a non-uniform cross-section with a major cross-sectional axis and a minor cross-sectional axis and said mold and said catalytic converter element are configured so that a thicker layer of flowable mounting material is disposed substantially parallel to the major cross-sectional axis than substantially parallel to the minor cross-sectional axis.

25. The method of claim 1, wherein a wire mesh is disposed around said catalytic converter element prior to injecting said flowable mounting material into the mold.

26. The method of claim 1, wherein said catalytic converter element comprises a ceramic monolith.

27. A method of making a diesel particulate filter comprising:

(a) placing a diesel particulate filter element in a mold;

(b) injecting a sufficient amount of a flowable mounting material into the mold to form a seamless continuous coating around a portion of the element, the flowable mounting material comprising 2 to 90 dry weight percent of at least one unexpanded intumescent material, 10 to 98 dry weight percent of binder, 0 to 25 dry weight percent fibers, 0 to 70 dry weight percent of one or more fillers, and a liquid; and (c) removing the diesel particulate filter element from the mold.

28. A method of making a high temperature rigid filter comprising:

(a) placing a high temperature rigid filter element in a mold;

(b) injecting a sufficient amount of a flowable mounting material into the mold to form a seamless continuous coating around a portion of the element, the flowable mounting material comprising 2 to 90 dry weight percent of at least one unexpanded intumescent material, 10 to 98 dry weight percent of binder, 0 to 25 dry weight percent fibers, 0 to 70 dry weight percent of one or more fillers, and a liquid; and (c) removing the high temperature rigid filter element from the mold.

* * * * *